United States Patent
Ludwig

Patent Number: 5,811,037
Date of Patent: Sep. 22, 1998

[54] ENERGY-SAVING METHOD OF OPERATING AN INJECTION MOULDING MACHINE

[75] Inventor: Franz Josef Ludwig, Dürrholz, Germany

[73] Assignee: Dr. Boy GmbH, Germany

[21] Appl. No.: 862,518

[22] Filed: May 23, 1997

[30] Foreign Application Priority Data

May 31, 1996 [DE] Germany ............. 196 21 904.3

[51] Int. Cl.$^6$ ............................. B29C 45/82
[52] U.S. Cl. ............. 264/40.1; 264/328.1; 425/160; 425/156; 425/589
[58] Field of Search .................. 264/40.1, 40.5, 264/328.1, 349; 425/135, 150, 156, 160, 167, 589, 590, 595, 450.1, 451.2, 451.9

[56] References Cited

U.S. PATENT DOCUMENTS

| | | | |
|---|---|---|---|
| 3,642,403 | 2/1972 | Havlik | 425/590 |
| 3,663,140 | 5/1972 | Hehl | 425/590 |
| 4,565,116 | 1/1986 | Hehl | 425/590 |
| 4,828,476 | 5/1989 | Yoshiharu et al. | 425/590 |
| 5,176,859 | 1/1993 | Leffew | 425/590 |
| 5,529,478 | 6/1996 | Siegrist et al. | 425/590 |
| 5,660,783 | 8/1997 | Urbanek et al. | 425/590 |
| 5,674,541 | 10/1997 | Svoboda | 425/590 |

Primary Examiner—Jill L. Heitbrink
Attorney, Agent, or Firm—Blakley Sokoloff Taylor & Zafman

[57] ABSTRACT

A method is disclosed of operating an injection molding machine including a hydraulic device (1) which has an asynchronous main drive motor (10) driving a hydraulic pump (2). The injection molding machine is operated in an injection molding cycle with a cooling phase and a phase in which an injection molding tool is opened following the cooling phase. It is determined before commencement of the injection molding cycle if the duration of the cooling phase is above a minimum duration. If the duration of the cooling phase is above the minimum duration the asynchronous main drive motor (10) is switched off after or at commencement of the cooling phase and is switched on again before commencement of the phase in which the injection molding tool is opened. Electrical energy is saved by switching off the main drive motor in dependence on the cycle. The injection molding material for the subsequent injection molding cycle is advantageously supplied in a dosed manner with the aid of a supply device driven by means of an auxiliary asynchronous motor whilst the main drive motor is switched off. Shortly before or during the switching on again of the main drive motor (10) before the end of the cooling phase, the latter is started by converting mechanical energy stored in the hydraulic device (1) into rotational energy of the shaft (11) of the main drive motor (10), which saves additional energy for starting the drive motor. When the main drive motor is switched on again, the starting current is limited to twice the nominal current by means of a special control circuit.

11 Claims, 1 Drawing Sheet

ENERGY-SAVING METHOD OF OPERATING AN INJECTION MOULDING MACHINE

FIELD OF THE INVENTION

The invention relates to a method of operating an injection moulding machine including a hydraulic device which has an asynchronous main drive motor driving a hydraulic pump, the injection moulding machine being operated in an injection moulding cycle with a cooling phase and a phase in which the injection moulding tool is opened following the cooling phase. The invention further relates to an injection moulding machine.

DESCRIPTION OF THE PRIOR ART

An injection moulding cycle is typically divided into a number of phases which are distinguished by a substantially varying power requirement. When the tool is locked and closed very high power peaks are briefly necessary which must be applied by the hydraulic pump and thus by the electric motor driving the hydraulic pump. On the other hand, only a very low power or no power is necessary during the cooling phase, for instance, with the exception of the power which is necessary for the dosed supply of the injection moulding material for a subsequent injection moulding cycle.

The hydraulic pump capacity and the capacity of the electric drive motor must be designed for the maximum powers necessary during closing and locking of the tool. The nominal output of the motor is generally selected to be somewhat below this maximum necessary power so that the electric motor used as the main drive is briefly operated in the overload region. Since the peak powers take up only a relatively small proportion of the time of the overall cycle, the electric motor is significantly oversized for the major portion of the injection moulding cycle which results in a poor degree of efficiency and thus in unnecessary energy losses.

DE 4335403 C1 discloses a hydraulic device for supplying a working unit, particularly a working unit on a plastic injection moulding machine, in which the problem of energy saving is solved by using a three-phase motor which is speed controlled by means of a frequency converter. A three-phase synchronous motor is used. The solution proposed in this patent specification is relatively expensive because on the one hand three-phase synchronous motors are more expensive than asynchronous motors and on the other hand a relatively complex and expensive electronic control system is necessary.

It is thus the object of the invention to reduce the energy consumption of an injection moulding machine with the aid of an economical solution.

SUMMARY OF THE INVENTION

This object is solved by a method of operating an injection moulding machine.

The energy saving is achieved in the invention by energy management dependent on the injection moulding cycle. Before the commencement of an injection moulding cycle the duration of the cooling phase is determined which is dependent, amongst other things, on the injection moulding material and the injection mould or the injection moulding tool. It is subsequently determined whether the duration of the cooling phase is above a minimum duration which is dependent on the type of electric motor and on the type of the hydraulic pump. The minimum duration is the duration of the cooling phase below which switching off the main drive during the cooling phase would no longer result in an energy saving. During the injection moulding cycle the asynchronous main drive motor is switched off after the beginning of the cooling phase and switched on again before the beginning of the phase in which the injection moulding tool is opened again, if the duration of the cooling phase is above the minimum duration.

During the cooling phase of an injection moulding cycle, injection moulding material is generally supplied for the subsequent injection moulding cycle in a dosed manner with the aid of a supply device. If the supply device is also driven by the hydraulic system a certain power is required during the dosing process. In this exemplary embodiment the main drive motor is only switched off before the dosing process if the dosing process takes place at the end of the cooling phase or is only switched off after the dosing process, if the dosing process takes place at the beginning of the cooling phase. For this purpose, the duration of the dosing process is taken account of when determining the minimum duration of the cooling phase necessary for switching off. If the dosing process takes place during substantially the entire cooling period the main drive motor would not be switched off.

An advantageous embodiment of the method in accordance with the invention is characterised in that, during the cooling phase of an injection moulding cycle, injection moulding material is supplied in a dosed manner for the subsequent injection moulding cycle with the aid of a supply device operated by rotary motion and that the supply device is driven by means of a further auxiliary asynchronous motor. In this embodiment, use is made of the fact that the supply device for the dosing, which is commonly constructed as a screw, is actuated by rotary movement and that electric motors are best suited for producing rotary motion. The electric motor can drive the supply device directly or via an appropriate gearbox. The power of the additional asynchronous motor, which drives the supply device, can be optimally matched to the power necessary for the dosing process. Further advantages of the electric motor by comparison with a hydraulic motor reside in the high degree of efficiency of the electric motor and in a low noise level. A standard motor can be used as the electric motor which is characterised by an uncomplicated, maintenance-free construction, simple control and low costs.

Furthermore, the provision of the separate drive for the dosing of the material has the advantage that the dosing is possible in parallel with all the other hydraulically driven movements and in the extreme case can be performed up to the time of commencement of the injection. As a result of the relatively long time window for the dosing process within the overall injection moulding cycle, low rotational speeds of the supply device (screw) are possible which has the effect of reducing the stresses of the material. Furthermore, the dosing can be so adjusted that a longer residence time of the injection moulding material does not occur.

Another advantageous embodiment of the invention is characterised in that shortly before or during the switching on again of the asynchronous main drive motor before the end of the cooling phase, the latter is started by converting the mechanical energy stored in the hydraulic device into rotational energy of the shaft of the asynchronous main drive motor. If the asynchronous main drive motor is switched off during a sufficiently long cooling phase, it must be switched on again at the correct time before completion of the cooling phase in order to render the subsequent hydraulically actuated movements (opening of the tool) possible. As a result of the inertia of the portions of the motor, which are to be set in rotation, a higher power is necessary for starting the motor than for continuous operation of the motor. In order to limit the electrical power necessary for starting purposes and thus to reduce the energy consumption, the hydraulic energy stored in the hydraulic system is used in order to facilitate starting of the main drive motor.

In an advantageous embodiment the mechanical energy stored in the hydraulic device is converted into rotational energy of the drive shaft by back-driving the hydraulic pump coupled to the drive shaft. This is achieved by suddenly releasing the energy stored in the hydraulic system by means of appropriate valve arrangements at the end of the cooling period and conducting the hydraulic fluid, which flows out in the manner of a surge, into the hydraulic pump. The hydraulic pump and thus the main drive motor are thus caused to rotate which facilitates starting of the motor if the electric current supply is simultaneously switched on.

When the asynchronous main drive motor is switched on again, the starting current is preferably limited by means of a special control circuit, whereby the current flow is preferably limited to twice the nominal current.

The injection moulding machine in accordance with the invention serves particularly to carry out the method in accordance with the invention in which, whilst the main drive motor is switched off in the cooling phase, the supply device for the dosed supply of injection moulding material is driven by means of a further asynchronous motor. The second asynchronous motor for driving the supply device is an economical standard motor which is characterised by an uncomplicated, maintenance-free construction and simple control. Its nominal output can be matched to the requirement of the supply device. The injection moulding machine in accordance with the invention permits the asynchronous motor driving the hydraulic pump to be switched off during a sufficiently long cooling phase and thus permits a considerable energy saving.

An advantageous embodiment of the injection moulding machine is characterised in that the first asynchronous motor, which drives the hydraulic pump, is provided with a flywheel mass. The flywheel mass permits an additional reduction of the nominal output of the asynchronous motor driving the hydraulic pump with the power variation which is typical for injection moulding machines during the injection moulding cycle. High power loads occur only briefly in an injection moulding cycle so that these brief power peaks can be compensated for by the kinetic energy stored in the flywheel mass. By making use of the kinetic energy stored in the flywheel mass the motor can briefly be loaded with up to a multiple of its actual nominal capacity. The larger the flywheel mass the more closely can the motor output be approximated to the mean value of the power requirement of the overall injection moulding cycle. On the other hand, a motor with a large flywheel mass requires a longer start-up time or a higher starting energy during the switching on process which is possibly necessary at the end of the cooling phase. The size of the flywheel mass should be optimised taking account of these requirements.

Advantageous embodiments of the invention are characterised in the dependent claims.

The invention will be described below in more detail with reference to an exemplary embodiment illustrated in the drawings, in which:

FIG. 1 is an elementary view of the power variation during an injection moulding cycle; and FIG. 2 is an elementary view of the important components of the injection moulding machine in accordance with the invention.

DESCRIPTION OF THE PREFERRED EMBODIMENT

Figure 1:
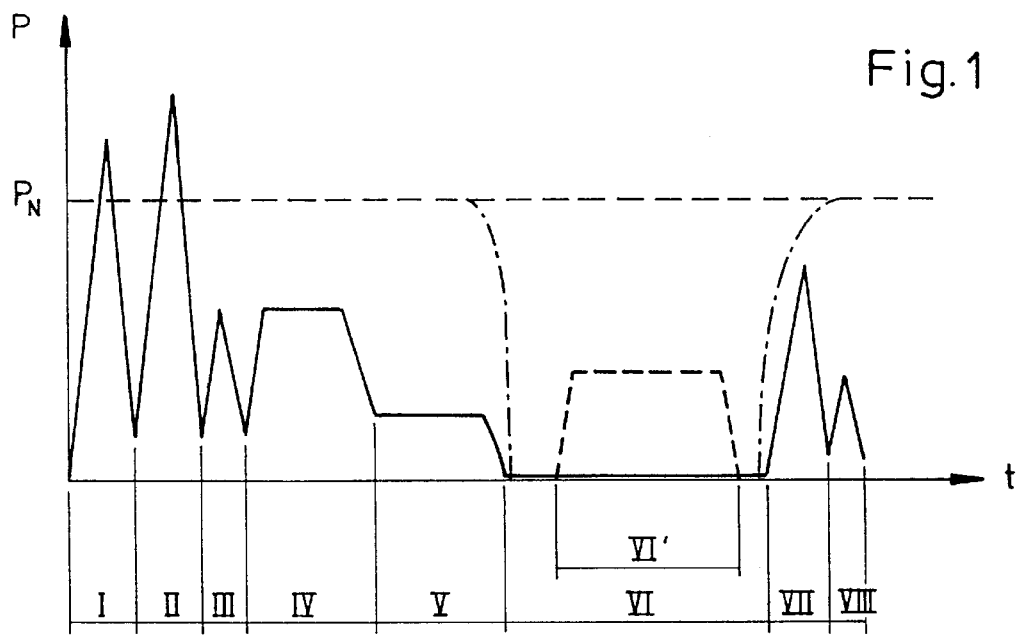

FIG. 1 shows the basic variation of the power requirement during a typical injection moulding cycle. The power requirement P is shown in dependence on time t. Eight phases of an injection moulding cycle are shown with very different power requirements.

In Phase I, the injection moulding tool is closed with the aid of a hydraulic drive. In order to keep the total cycle time short, the closing process is effected at relatively high speed. This briefly necessitates a high power. The tool is locked in Phase II. This is also effected with the aid of the hydraulic drive, whereby high power is also briefly necessary. On commencement of operation of the injection moulding unit in Phase III, low power is briefly necessary. When the injection moulding material is injected in Phase IV, medium power is necessary for the entire injection process. Relatively low power is required in the post-pressure phase V. No power or only very low power is required during the cooling Phase VI since no hydraulically actuated movements occur. After the injection moulding has cooled down in the tool, the tool is opened in Phase VII. This hydraulically actuated, brief and rapid movement requires a short power pulse of medium height. Depending on the shape of the injection moulding and the material used, following Phase VII a Phase VIII, in which the injection moulding is ejected, can be necessary which requires one or more brief movement pulses and thus power pulses.

This injection moulding cycle is generally followed by a further injection moulding cycle. The injection moulding material for the subsequent injection moulding cycle is generally supplied during the preceding injection moulding cycle. The dosed supply of the injection moulding material requires drive energy for the supply device, which is generally constructed in the form of a screw, which transports and compresses the material within a heated barrel, whereby it is melted. The power necessary for driving the supply device during the dosing process is shown in chain lines in FIG. 1 during Phase VI'. If the supply device is driven hydraulically by means of the hydraulic system which is present, the dosing process takes place (as shown in FIG. 1) during the cooling phase VI.

In the preferred exemplary embodiment the supply device for the dosing process is electrically driven by an auxiliary asynchronous motor. In this case, the dosing process can take place not only during the cooling phase VI but can basically extend over the adjacent phases V, VII and VIII and even over Phases I to III of the subsequent cycle. This permits greater flexibility in the operation of the injection moulding machine. As a result of the extended dosing Phase VI', lower speeds of the dosing screw are possible which has the effect of subjecting the material to lower stresses. Furthermore, a reduction in the residence time of the material is possible by moving the dosing phase to directly before the injection Phase IV.

The nominal output of the main drive motor is shown in FIG. 1 by the horizontal line designated $P_n$. The nominal output of the motor is so selected that a brief overload of the motor occurs during the power peaks in Phases I and II. For instance, a 15 kW motor is used with power peaks of up to 22 kW. During the major portion of the injection moulding cycle, however, the motor capacity is considerably above the required power. This results in a poor degree of efficiency. Therefore, in the preferred exemplary embodiment, the main drive motor is switched off at the beginning of the cooling Phase VI, which is shown in FIG. 1 by the chain-dotted line.

The decision as to whether the main drive motor is switched off or not, is made with the aid of a microprocessor controller operating with a control program. The desired duration of the cooling phase, the type of motor and the type of hydraulic pump are taken account of. If the duration of the cooling phase is above a minimum duration, the controller decides to switch off the main drive. With very short cycle times, switching off is not worthwhile for energy reasons. If the duration of the cooling phase selected by the operative of the injection moulding machine is only slightly below the threshold time at which switching off would be worthwhile, this is drawn to the attention of the operative and a longer cooling phase is suggested to him with which an additional energy saving can be achieved by switching off the main drive. At the same time, the operative is informed by the control software how he can shorten the cycle time, which has been extended by the longer cooling phase, by shortening other phases, for instance by making movements more rapid.

Figure 2:
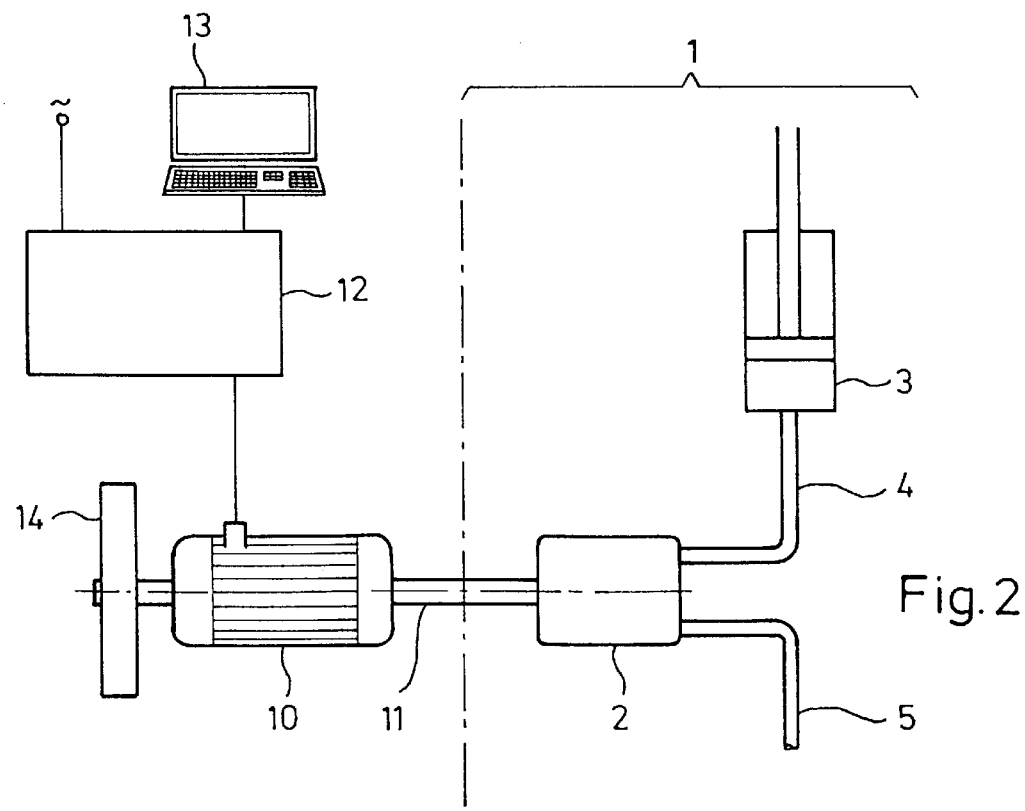

FIG. 2 is a basic view of the elements of the injection moulding machine of importance for the invention. The injection moulding machine has a hydraulic device 1 (the hydraulic device in FIG. 2 includes the portion separated off by the chain-dotted line) with a hydraulic pump 2. The portion 3, which is shown symbolically as a piston guided in a barrel, of the hydraulic device 1 characterises in the portion in which the hydraulic energy can be stored. This portion 3 of the hydraulic device 1 is connected to the hydraulic pump 2 via a pipe 4. A second pipe 5 leads from the hydraulic pump 2 to a tank which contains a reservoir of the hydraulic fluid. The hydraulic pump 2 is connected to an electric motor 10 by means of the drive shaft 11. The electric motor 10 is preferably an economical asynchronous standard motor. The electric motor 10 serving as the main drive motor has a flywheel mass 14. The electric motor 10 is supplied with electric current by a control device 12. The control device 12 is also coupled to the voltage supply connection for the injection moulding machine.

The control device 12 includes, amongst other things, a microprocessor or another central processing unit and at least one storage device for programs and data and is coupled to a display and input device 13 for the operative. A control program is operated on the microprocessor. The control device 12 controls the entire operation of the injection moulding machine including the progress of the cycle. The operative can input different parameters via the device 13. He also obtains information from the display relating to the progress of the cycle and the operating conditions of the injection moulding machine.

In the preferred exemplary embodiment the control device 12 includes, in addition to a switching device for switching the electric motor on and off, a special control device which can limit the current flow through the electric motor 10. The current flow is preferably limited to twice the nominal current. Furthermore, the control device 12 includes a device for switching the additional second electric motor, which drives the dosing device, on and off. The current limiting circuit for the electric motor 10 operates in conjunction with a special method of starting the electric motor when it is switched on at the end of the cooling phase. Shortly before switching on or at the same time as switching on the current-limited electric current supply for the electric motor 10, the drive shaft 11 is set in rotary motion with the aid of the back-driven hydraulic pump 2. In order to drive the drive shaft 11, the energy stored in the hydraulic system (indicated symbolically by the device 3) is suddenly released at the end of the cooling period by conducting the hydraulic fluid in the reverse direction through the pipe 4 into the hydraulic pump 2 and out of the hydraulic pump 2 via a pipe 5 into the tank by opening appropriate valves. The current limiting circuit and the hydraulic apparatus are so dimensioned and the time sequence is so controlled that a minimum of electric energy is necessary for starting the electric motor 10.

I claim:

1. A method of operating an injection moulding machine, the injection moulding machine including a hydraulic device, which includes a hydraulic pump and an asynchronous main drive motor, said asynchronous main drive motor having a shaft which is connected to said hydraulic pump in order to drive said hydraulic pump, an injection moulding tool which is adapted to be opened by said hydraulic device, and a supply device connected to said injection moulding tool for supplying injection moulding material in a dosed manner, wherein said injection moulding machine is operated in at least one injection moulding cycle, said injection moulding cycle including the steps of closing said injection moulding tool, supplying and injecting said injection moulding material, cooling said injection moulding tool in a cooling phase and opening said injection moulding tool following said cooling phase, said method further including the steps of:

a) determining the duration of said cooling phase and comparing said duration of said cooling phase with a minimum duration before the commencement of said injection moulding cycle, and b) when the duration of said cooling phase is longer than said minimum duration, switching off said asynchronous main drive motor at the earliest at commencement of said cooling phase and switching on said asynchronous main drive motor again before said injection moulding tool is opened.

2. The method as claimed in claim 1, wherein during the cooling phase of one injection moulding cycle the supply device supplies the injection moulding material for a subsequent injection moulding cycle in a dosed manner and wherein the supply device is driven by means of an auxiliary asynchronous motor.

3. The method as claimed in claim 1, wherein the asynchronous main drive motor is started at the earliest shortly before it is switched on again by mechanical energy stored in the hydraulic device which is converted into rotational energy of the shaft of the asynchronous main drive motor.

4. The method as claimed in claim 3, wherein the conversion of the mechanical energy stored in the hydraulic device into rotational energy of the shaft of the asynchronous main drive motor is performed by back-driving the hydraulic pump coupled to the shaft of the asynchronous main drive motor.

5. The method as claimed in claim 3, wherein the asynchronous main drive motor consumes a starting current when it is switched on again and wherein the starting current is limited.

6. The method as claimed in claim 5, wherein the asynchronous main drive motor consumes a nominal current in normal operation and wherein the starting current is limited to twice the nominal current.

7. The method as claimed in claim 1, wherein the minimum duration is determined in dependence on technical parameters of the hydraulic pump and of the asynchronous main drive motor and the result of the comparison of the minimum duration and of the duration of the cooling phase is displayed to an operative of the injection moulding machine.

8. The method as claimed in claim 7, wherein the operative is additionally made aware of possibilities for changing the injection moulding cycle if the duration of the cooling phase is at most slightly shorter than the minimum duration.

9. An injection moulding machine including
a hydraulic device comprising a hydraulic pump and an asynchronous main drive motor driving said hydraulic pump,
an injection moulding tool which is adapted to be opened by said hydraulic device, and
a supply device connected to said injection moulding tool for supplying injection moulding material in a dosed manner,
wherein said injection moulding machine is operated in at least one injection moulding cycle which includes a cooling phase and a phase in which said injection moulding tool is opened following said cooling phase,
said injection moulding machine further including a control means for controlling the time sequence of said injection moulding cycle and for determining the duration of said cooling phase, said control means comprising a storage means for storing a minimum duration of the cooling phase and a comparing means for comparing said duration with said minimum duration before the commencement of the injection moulding cycle, and
switching means for switching off said asynchronous main drive motor at the earliest at commencement of the cooling phase when said duration of the cooling phase is longer than said minimum duration and switching on said asynchronous main drive motor before commencement of the phase in which the injection moulding tool is opened.

10. The injection moulding machine as claimed in claim 9, wherein an asynchronous auxiliary drive motor is provided which drives the supply device whilst the asynchronous main drive motor is switched off.

11. The injection moulding machine as claimed in claim 10, wherein the asynchronous main drive motor has a flywheel mass.

* * * * *